(12) United States Patent
Young et al.

(10) Patent No.: US 11,991,172 B2
(45) Date of Patent: May 21, 2024

(54) DOUBLE ANTI-PHISH, PERSONALIZED, SECURITY TOKEN FOR USE WITH ELECTRONIC COMMUNICATIONS

(71) Applicant: Bank of America Corporation, Charlotte, NC (US)

(72) Inventors: Michael Young, Davidson, NC (US); Vinesh Patel, London (GB); Melissa Gordon Glenn, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 310 days.

(21) Appl. No.: 17/707,097

(22) Filed: Mar. 29, 2022

(65) Prior Publication Data
US 2023/0319029 A1    Oct. 5, 2023

(51) Int. Cl.
*H04L 29/06* (2006.01)
*H04L 9/40* (2022.01)

(52) U.S. Cl.
CPC ...... *H04L 63/0853* (2013.01); *H04L 63/1483* (2013.01)

(58) Field of Classification Search
CPC . H04L 63/0853; H04L 63/1483; H04L 51/08; H04L 51/10; H04L 51/212; H04L 63/08
See application file for complete search history.

(56) References Cited

U.S. PATENT DOCUMENTS

| | | | |
|---|---|---|---|
| 6,965,919 B1 * | 11/2005 | Woods | H04L 51/212 709/206 |
| 7,290,035 B2 | 10/2007 | Mattathil | |
| 7,802,298 B1 | 9/2010 | Hong et al. | |
| 7,841,003 B1 | 11/2010 | Emdee | |
| 8,949,978 B1 | 2/2015 | Lin et al. | |
| 10,366,373 B1 * | 7/2019 | Denker | G06Q 20/047 |
| 10,609,072 B1 * | 3/2020 | Weldon | H04L 67/02 |
| 10,931,709 B2 | 2/2021 | Parekh | |
| 11,055,394 B2 | 7/2021 | Norris, III | |

(Continued)

OTHER PUBLICATIONS

"USAA Suspicious Emails," https://www.usaa.com/inet/wc/security_strange_email#:~:text=Cybercriminals%20may%20try%20and%20trick.to%20every%20email%20we%20send, USAA, Retrieved on Jan. 24, 2022.

(Continued)

*Primary Examiner* — Harunur Rashid
(74) *Attorney, Agent, or Firm* — Weiss & Arons LLP

(57) ABSTRACT

A double anti-phish, personalized, security token for use with electronic communications is provided. The security token may be embedded in each electronic communication transmitted from an entity to a recipient. A first part of the token may be embedded in a body of the communication. A second part of the token may be embedded in a header of the communication. The second part of the security token may validate that the electronic communication is indeed from the entity. Upon validation, the second part may instruct the first part to display a validation symbol. Upon failure to validate, the second part may instruct the first part to display an alert symbol. The recipient receiving the electronic communication may use the first part of the validation symbol as a visual aid to determine a level of confidence of whether the electronic communication has been validated as being transmitted by the entity.

16 Claims, 4 Drawing Sheets

(56) References Cited

U.S. PATENT DOCUMENTS

| | | | |
|---|---|---|---|
| 11,381,598 B2 | 7/2022 | Nunes et al. | |
| 11,546,377 B2 | 1/2023 | Boshmaf et al. | |
| 11,785,004 B2 | 10/2023 | Soon-Shiong et al. | |
| 11,882,112 B2 | 1/2024 | Keiter et al. | |
| 2007/0074119 A1* | 3/2007 | Komine | G06F 21/36 |
| | | | 715/743 |
| 2008/0034428 A1 | 2/2008 | Bejar et al. | |
| 2008/0046968 A1* | 2/2008 | Cline | H04L 63/1483 |
| | | | 726/2 |
| 2009/0292025 A1* | 11/2009 | Braude | A61P 25/20 |
| | | | 564/162 |
| 2009/0292925 A1 | 11/2009 | Meisel | |
| 2010/0031022 A1* | 2/2010 | Kramer | H04L 63/1483 |
| | | | 726/3 |
| 2013/0139238 A1* | 5/2013 | Ryan | G06F 21/55 |
| | | | 726/7 |
| 2014/0137192 A1* | 5/2014 | Arroyo-Figueroa | H04L 63/08 |
| | | | 726/3 |
| 2014/0181216 A1 | 6/2014 | Liebmann et al. | |
| 2016/0182418 A1* | 6/2016 | Gupta | H04L 63/08 |
| | | | 709/206 |
| 2017/0230416 A1 | 8/2017 | Sabarish | |
| 2020/0259772 A1 | 8/2020 | Dubie et al. | |
| 2020/0358798 A1 | 11/2020 | Maylor et al. | |
| 2021/0211462 A1 | 7/2021 | Birch et al. | |
| 2021/0218736 A1 | 7/2021 | Kumar et al. | |
| 2022/0070215 A1 | 3/2022 | Stolfo et al. | |
| 2022/0116420 A1 | 4/2022 | Weber et al. | |
| 2022/0318938 A1 | 10/2022 | Ogawa | |
| 2022/0385648 A1* | 12/2022 | Keiter | H04L 63/083 |
| 2022/0385693 A1 | 12/2022 | Keiter et al. | |
| 2023/0086249 A1* | 3/2023 | Albero | H04L 51/212 |
| | | | 726/9 |
| 2023/0291765 A1 | 9/2023 | Young et al. | |

OTHER PUBLICATIONS

"What Is An Email Header?—Guide," https://sendpulse.com/support/glossary/email-header, SendPulse, Retrieved on Mar. 21, 2022.

"What Is An Email Header?" https://whatismyipaddress.com/email-header, CGP Holdings, Inc., Retrieved on Mar. 21, 2022.

* cited by examiner

DOUBLE ANTI-PHISH, PERSONALIZED, SECURITY TOKEN FOR USE WITH ELECTRONIC COMMUNICATIONS

FIELD OF TECHNOLOGY

Aspects of the disclosure relate to electronic communication security.

BACKGROUND OF THE DISCLOSURE

In recent years, the quantity of electronic communications has superseded non-electronic communications. Electronic communications involve an assortment of information exchange. Such information exchange includes both sensitive information, such as bank account data, and non-sensitive information, such as daily international news.

Because of the profitability associated with malicious capture of sensitive information, those of malicious intent have created various techniques for deceptively obtaining sensitive information. One of the deceptive techniques may include phishing.

Phishing software is a category of malware in which an imitation electronic communication is sent to a recipient. The electronic communication may impersonate a legitimate entity, organization or individual. The electronic communication may appear to have been transmitted by the impersonated entity, organization or individual. The electronic communication may include an information request, a funds request, a download request or any other malicious actionable.

Many times, phishing communications are transmitted as mass campaigns. For example, a malicious entity may harvest a plurality of emails addresses from a plurality of sources, including websites. The malicious entity may transmit a mass, non-targeted, email campaign that impersonates a financial institution. The email may include a request to click on a link to recertify a know your customer ("KYC") criteria. Once selected, the link may direct a user to a malicious webpage that replicates the look and feel of a financial institution. The malicious webpage may capture sensitive information relating to the unsuspecting user.

Because of the proliferation of malicious phishing communications, many users are weary of, and often frustrated with, entering information into and/or selecting links that are found within even legitimate electronic communications. Therefore, many legitimate electronic communications do not receive responses because the receivers are weary of phishing communications.

Therefore, it would be desirable for electronic communications originating from legitimate entities to be self-authenticating. As such, an anti-phish, personalized, security token may be injected into each electronic communication originating from a legitimate entity. The anti-phish, personalized, security token may increase the confidence of the receiving entity regarding the validity of the electronic communication.

SUMMARY OF THE DISCLOSURE

Apparatus and methods for self-authenticating and self-alerting electronic communications are provided. Methods may include generating an electronic communication at an originating server. The originating server may be powered by a hardware processor.

The electronic communication may include a header and a body. The header may include metadata of the electronic communication. The header may identify a recipient of the electronic communication. The header may be hidden from viewing by the recipient. The body may be openly visible to the recipient.

Methods may include forwarding the electronic communication from the originating server to an edge server. The edge server may be powered by a hardware processor. The originating server and the edge server may be located at the same location. The originating server and the edge server may be located at different locations.

Methods may include embedding a two-part, anti-phish token in the electronic communication. The embedding may be executed by process at the edge server.

The two-part, anti-phish token may include a first part and a second part. The first part may be openly visible within the body of the electronic communication. The second part may be hidden within the header of the electronic communication.

Methods may include validating the electronic communication. The validating may be executed by the second part of the token. In the event that the electronic communication is validated, a validation symbol may be retrieved from a database. In the event that the electronic communication fails to be validated, an alert symbol may be retrieved from the database. Based on the symbol that is retrieved from the database, the second part of the token may instruct the first part of the token to display the validation symbol or the alert symbol.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
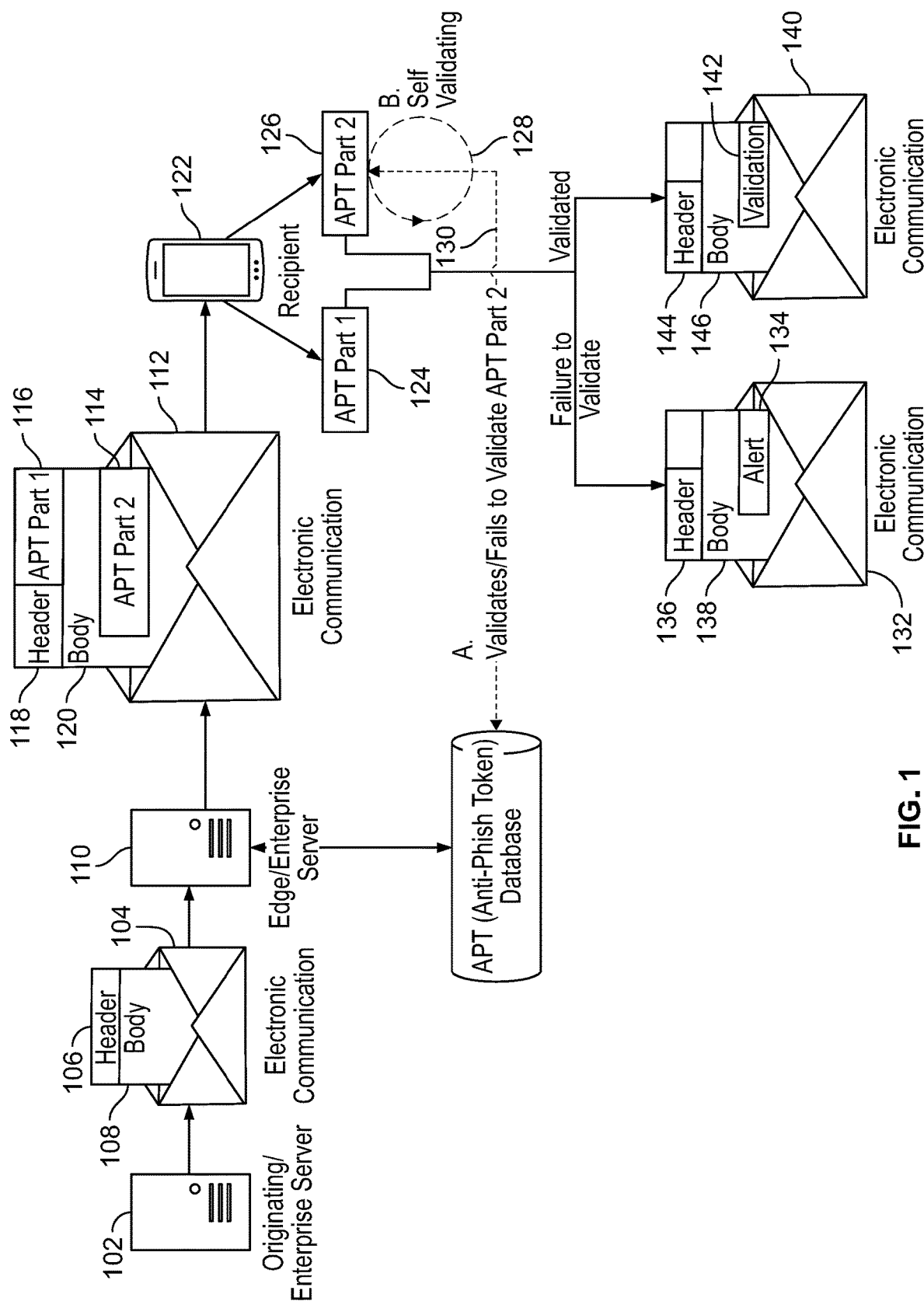
FIG. 1 shows an illustrative diagram in accordance with principles of the disclosure.

Apparatus, systems and methods for self-authenticating and self-alerting electronic communications are provided.

A system may include an originating server, an edge server and a database.

The originating server may generate an electronic communication. The electronic communication may be an email, a short messaging service (SMS), an instant messaging service (IMS), a message over an online messaging application, such as WhatsApp Messenger® and/or any other suitable electronic communication.

The originating server may be associated with an entity, such as an enterprise. The enterprise may communicate with numerous clients. At times, the electronic communication may be recipient-specific. An electronic communication, that originates at the originating server, may include multiple recipients. The multiple recipients may include a subset of the enterprise's clients. The multiple recipients may include the entirety of the enterprise's clients. Therefore, the electronic communication sent to multiple recipients may be identical electronic communications. These electronic communications may be referred to as mass electronic communications.

The originating server may generate an electronic communication. The electronic communication may include a header and a body. The header may include metadata of the electronic communication. The header may identify a recipient. The header may be hidden from the recipient. The body may be openly visible to the recipient.

Metadata included in the header of an electronic communication may include sender data, recipient data, date data relating to the time and date of when the communication was transmitted and route data from the sender to the recipient. Each time an electronic communication is transferred from one computing device to another computing device, a mail transfer agent (at each computing device) automatically stamps, flags or otherwise suitably affixes, attaches, records or stores the communication with information relating to the recipient.

Metadata included in the header of an electronic communication may also include a MIME-version. MIME may stand for Multipurpose Internet Mail Extensions. MIME-versions may be an internet standard that extends the format of an electronic communication by supporting text and non-text attachments. Such attachments may include audio files, video files, images, message bodies with multiple parts and any other suitable attachments.

Metadata included in the header of an electronic communication may also include a message identifier. The message identifier may be a globally unique identifier used in electronic communications. Message identifiers may have a specific format that is generated for a specific recipient address and message. As such, no two electronic communications may share a message identifier.

Metadata included in the header of an electronic communication may also include a DKIM signature(s). DKIM may stand for DomainKeys Identified Mail. DKIM signature may confirm the sender's authenticity by connecting the domain name with the electronic communication. DKIM may enable enterprises to vouch for electronic communication transmitted from their domain(s).

The originating server may forward the electronic communication to the edge server. In some embodiments, the originating server and the edge server may be located at the same platform.

At times, the originating server may be a mail server. The originating mail server may not be apprised about the edge server. In such embodiments, the originating server may transmit the electronic communication in the same way that any suitable electronic communications are transmitted. As such, the edge server may intercept electronic communications upon transmission from the originating mail server. It should be appreciated that the edge server may only intercept communications of which the recipients of the electronic communication have enrolled or otherwise opted-in to the anti-phish security protocol.

Therefore, the edge server may have an algorithm for identifying the recipients of the electronic communications and selecting the communications which the recipients have enrolled in the anti-phish security protocol. Such algorithms may include checking the recipient of each electronic communication against a list of addresses that enrolled in the anti-phish security protocol.

The edge server may embed a two-part, anti-phish token in the intercepted electronic communication. The two-part, anti-phish token may include a first part and a second part.

The first part may be openly visible within the body of the electronic communication. The first part may act as a quick visual aid to the recipient to indicate a level of confidence that the communication is indeed from the enterprise.

The second part may be hidden within the header of the electronic communication. The second part may validate the electronic communication. The validation may include communication with a validation server to determine the validity of the electronic communication. The validation server may be located at the same location as the originating server and/or the edge server. The validation server may be located at a different physical location as the originating server and/or the edge server. The validation server may compare the electronic communication received at the recipient to the electronic communications transmitted by the validation server. In some embodiments, the validation server may compare a hash of the electronic communication received at the recipient to a list of hashes of electronic communications transmitted by the originating server.

If the electronic communication is validated as being transmitted from the entity and therefore passes the validation process, the validation server may communicate the validation to the second part of the token. If the electronic communication fails the validation process, the validation server may communicate the failed validation to the second part of the token.

The first part of the token may act as a shell in order to display validation performed by the second part of the token. Therefore, upon validation, the second part of the token may instruct the first part of the token to display a validation symbol within the first part of the token. The validation symbol may be retrieved by the second part of the token from the database. The validation symbol may be specific to the recipient. The validation symbol may be selected, uploaded and/or created by the recipient and/or a machine-learning algorithm. In some embodiments, the recipient may instruct a machine-learning algorithm to create a validation symbol. The validation symbol may be selected, uploaded and/or created during a registration process for the anti-phish security protocol.

The validation symbol may be a photograph, a numeric code, a plurality of photographs, a plurality of animations, and/or any suitable combination of a photograph, a numeric code, an animation, a plurality of photographs and/or a plurality of animations. The validation symbol may be a dynamically-rotating, digital-artwork file. The dynamically-rotating, digital-artwork file may be linked to a non-fungible token ("NFT"). The digital-artwork file may rotate on a predetermined schedule. The digital-artwork file may rotate on a randomized schedule.

At times, the validation may fail. Such times may occur when an entity of malicious intent transmits a communication impersonating an enterprise. The entity of malicious intent may embed a false anti-phish token within the electronic communication. However, when the second part of the token attempts to validate the electronic communication, the validation may fail.

Upon validation failure, the second part of the token may instruct the first part of the token to display an alert symbol within the second part of the token. The alert symbol may be retrieved by the second part of the token from the database. The alert symbol may be specific to the recipient. The alert symbol may be selected, uploaded and/or created by the recipient and/or a machine-learning algorithm. In some embodiments, the recipient may instruct a machine-learning algorithm to create an alert symbol. The alert symbol may be selected, uploaded and/or created during a registration process for the anti-phish security protocol.

The alert symbol may be a photograph, a numeric code, a plurality of photographs, a plurality of animations, and/or any suitable combination of a photograph, a numeric code, an animation, a plurality of photographs and/or a plurality of animations. The alert symbol may be a dynamically-rotating, digital artwork file. The dynamically-rotating, digital-artwork file may be linked to an NFT. The digital-artwork file may rotate on a predetermined schedule. The digital-artwork file may rotate on a randomized schedule.

It should be appreciated that both the validation symbol and the alert symbol may be personalized and specific to the recipient. Therefore, the recipient may be able to easily identify whether the communication has been validated. Also, a symbol may be a validation symbol for a first recipient and an alert symbol for a second recipient.

In an example, a recipient may select a plurality of photographs of a favorite celebrity as a validation symbol. As such, in a valid electronic communication, a photograph of the celebrity may be displayed. It should be noted that the photograph may not be the same photograph in each valid communication. Rather, a photograph of the celebrity may be selected for each communication. The photograph may be selected from a predetermined group of photographs. The photograph may also be dynamically selected from an Internet source using a search engine. A natural language powered search for retrieving a relevant photograph may be created during the registration process. The natural language powered search may be executed by the database for each valid electronic communication.

In another example, a recipient may select a plurality of photographs of an opposing sports team as an alert symbol. As such, in a non-valid electronic communication, a photograph of a player from the opposing sports team may be displayed. It should be noted that the photograph may not be same photograph in each non-valid electronic communication. Rather a photograph of the opposing sports team may be selected for each communication. The photograph may be selected from a predetermined group of photographs. The photograph may also be dynamically selected from an Internet source using a search engine. A natural language powered search for retrieving a relevant photograph may be created during the registration process. The natural language powered search may be executed by the database for each non-valid electronic communication.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows an electronic communication. The electronic communication may include a double anti-phish, personalized, security token. The electronic communication may be transmitted from an enterprise to a recipient.

Originating/enterprise server 102 may generate electronic communication 104. Originating/enterprise server 102 may be located at an enterprise.

Multiple account holders may hold accounts with the enterprise. The enterprise may communicate with each of their account holders. There may be various communication channels in which the enterprise communicates with their account holders. These communication channels may include physical mail, email, SMS, IMS, online messaging applications and any other suitable channels.

At times, the communications may be specific to the recipient. An example of a specific communication may include communication of an account statement. Other times, communications may be generic to account holders. An example of a generic communication may include general account holder information, such as change in hours of operation or change in an enterprise policy.

The communications may be transmitted to the account holders using the different communication channels. At times, the communication channel may be selected by the recipient. Other times, the communication channel may be selected by the enterprise. Yet other times, the enterprise may communicate with the recipients using multiple channels.

Originating/enterprise server 102 may generate electronic communication 104. Electronic communication 104 may be a generic enterprise communication. As such, electronic communication 104 may have multiple recipients.

Electronic communication 104 may be a specific enterprise communication. Therefore, electronic communication 104 may have one recipient.

Electronic communication 104 may include header 106 and body 108. Header 106 may include metadata relating to electronic communication 104. The metadata may include sender data, recipient data, time stamp data and any other suitable data. Header 106, or most of header 106, may be hidden from viewing by a recipient. Body 108 may include an openly visible section of electronic communication 104. Body 108 may be typically read by a recipient.

In some embodiments, originating/enterprise server 102 may transmit electronic communication 104 to edge/enterprise server 110.

In certain embodiments, originating/enterprise server 102 may be unaware of edge/enterprise server 110. In such embodiments, originating/enterprise server 102 may transmit electronic communication 104 to one or more recipients. Once electronic communication 104 has been transmitted from originating/enterprise server 102, edge/enterprise server 110 may intercept electronic communication 110.

Edge/enterprise server 110 may also be located at the enterprise. Edge/enterprise server 110 may manipulate electronic communications. At times, edge/enterprise server 110 may only manipulate electronic communications associated with recipients that enrolled in an anti-phish security protocol.

Edge/enterprise server 110 may communicate with anti-phish token database 132. Anti-phish token database 132 may store anti-phish tokens that have been selected, created or generated by account holders.

Edge/enterprise server 110 may inject a double anti-phish token in each electronic communication being transmitted to an account holder that subscribed to the anti-phish security protocol. For each electronic communication, a first part of the anti-phish token may be injected into the header of the electronic communication, and a second part of the anti-phish token may be injected into the body of the electronic communication.

Electronic communication, shown at 112, may have been manipulated by edge/enterprise server 110. Header 118 may be shown with anti-phish token part 1 (116). Body 120 may be shown with anti-phish token part 2 (114).

Electronic communication 112 may be forwarded to recipient 122. Although recipient 122 is shown with a mobile device, recipient 122 may utilize any suitable device, including a personal computer ("PC"), tablet or any other suitable device.

Recipient 122 may receive electronic communication 112. Electronic communication 112 may include anti-phish token part 1 and anti-phish token part 2. Anti-phish token part 1 is shown at 124. Anti-phish token part 2 is shown at 126. Anti-phish token part 1 may be a shell to display the validation performed by anti-phish token part 2.

Anti-phish token part 2 may validate the communication using one or more of a plurality of validation methods. A first validation method, shown at 120 may be validating the communication with APT database 132. APT part 2, shown at 126 may communicate with APT database 132. The communication between APT part 2 and database 132 may include various details of the electronic communication. The various details may include a timestamp, a subject line, a hash of the electronic communication and any other suitable details.

APT database 132 may be linked to edge/enterprise server 110. APT database may store information relating to each electronic communication transmitted by edge/enterprise server 110.

APT database 132 may validate the electronic communication by comparing the received details to the details stored in the database. If the received details match the stored details above a predetermined threshold of similarity, database 132 may respond to APT part 2 with a validation indication. If the result of the comparison between the received details and the stored details is below the predetermined threshold of similarity, database 132 may respond to APT part 2 with an alert indication.

A second validation method may be a self-validation method, shown at 128. When a self-validation method is used, APT part 2 may store sufficient information to validate the electronic communication. Additionally, APT part 2 may also store both a validation symbol and an alert symbol.

Once the electronic communication passes validation or fails validation, the electronic communication displays a validation symbol or alert symbol in the electronic communication. The validation symbol or alert symbol may be displayed within the body of the electronic communication. The validation symbol or alert symbol may be displayed within the APT part 1.

The validation symbol or alert symbol may be specific to the recipient. The validation symbol and alert symbol may be stored within the APT part 2. The validation symbol and alert symbol may be stored in database 132. In the event that the validation symbol and alert symbol is stored within database 132, during the communication between APT part 2 and database 132, the appropriate symbol—i.e., either the validation symbol or the alert symbol may be transmitted to APT part 2.

Electronic communication 132 shows an electronic communication that failed validation. Alert symbol 134 may be displayed within body 138 of electronic communication 132. Header 136 may include the metadata of electronic communication 132.

Electronic communication 132 shows an electronic communication that passed validation. Validation symbol 142 may be displayed within body 146 of electronic communication 140. Header 144 may include the metadata of electronic communication 140.

Figure 2:
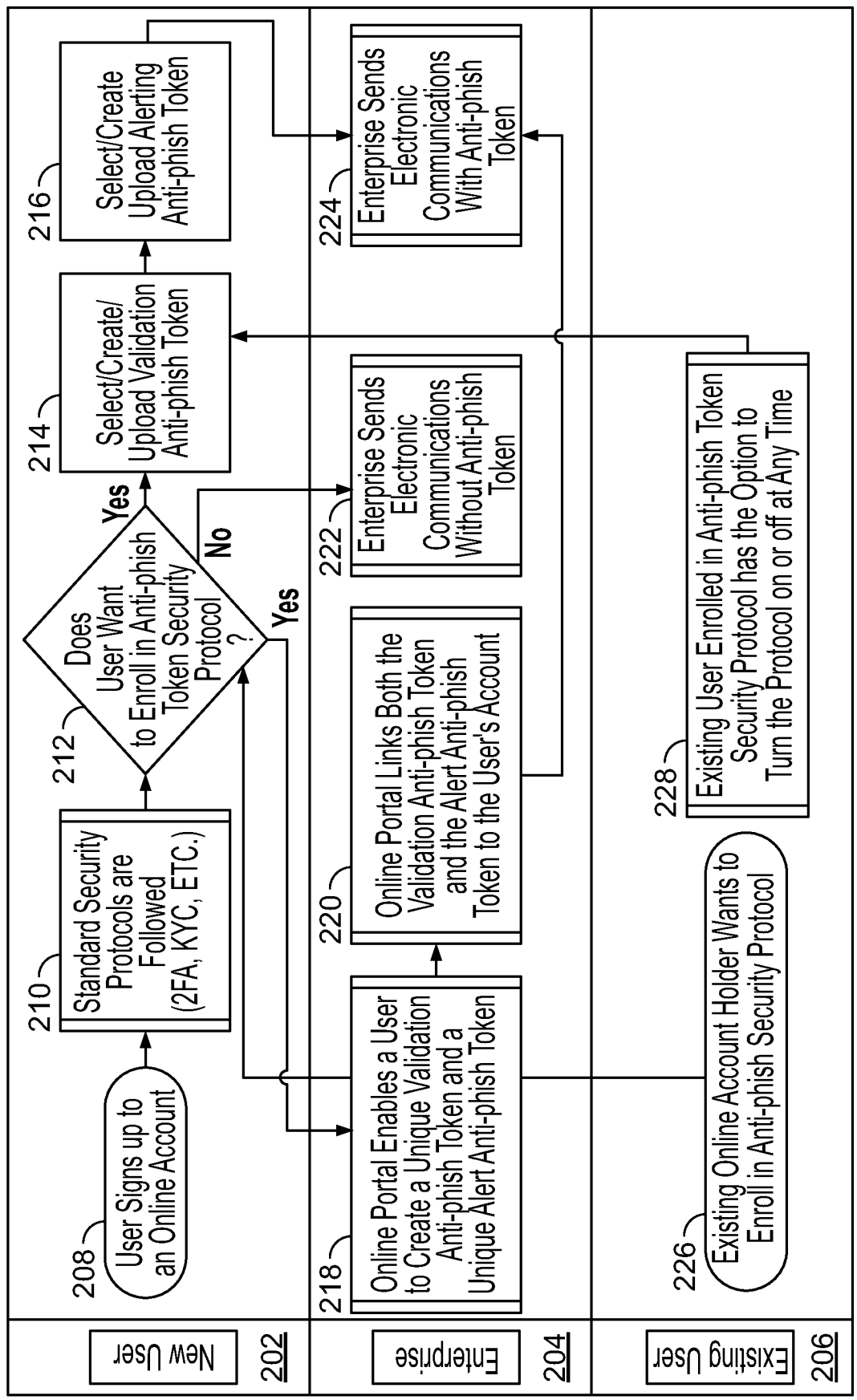
FIG. 2 shows another illustrative diagram in accordance with principles of the disclosure.

FIG. 2 shows an illustrative diagram. The illustrative diagram includes three swim lanes: a new user swim lane 202, an enterprise swim lane 204 and an existing user swim lane 206.

A user may sign up for an online account, as shown at 208. The online account may be with an enterprise. Standard security protocols may be followed during instantiation of the account, as shown at 210. Standard security protocols may include two-factor authentication ("2FA"), know your customer ("KYC") and any other suitable security protocols.

An online portal may enable a user to enroll in an anti-phish token security protocol, as shown at 212. If the user enrolls in the anti-phish token security protocol, the user may be presented an option to select, create and/or upload a validation anti-phish token, as shown at 214. If the user enrolls in the anti-phish token security protocol, the user may also be presented the option to select, create and/or upload an alerting anti-phish token, as shown at 216.

If the user enrolls in the anti-phish token security protocol, the online portal of the enterprise may enable the user to create a unique validation anti-phish token and a unique alert anti-phish token, as shown at 218. The online portal may link both the validation anti-phish token and the alert anti-phish token to the user's account, as shown at 220.

If the user does not enroll in the anti-phish token security protocol, the enterprise sends electronic communications without an anti-phish token, as shown at 222. Once the anti-phish token has been selected, created and/or uploaded, the enterprise may transmit electronic communications with the anti-phish token, as shown at 224.

Existing online account holders may want to enroll in an anti-phish security protocol, as shown at 226. Such account holders may be given the opportunity to do so using the online portal.

Existing users enrolled in anti-phish token security protocols may have the option to turn the protocol on or off at any time, as shown at 228. It should be appreciated that at times, the feature to turn the protocol on or off may be made unavailable to users.

Figure 3:
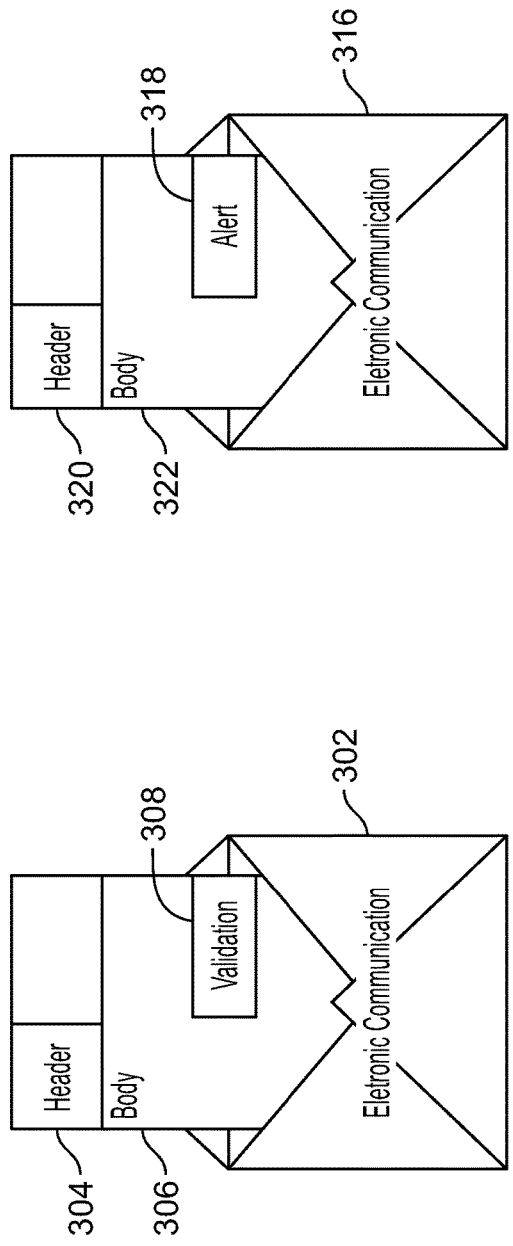
FIG. 3 shows yet another illustrative diagram in accordance with principles of the disclosure.
Figure 3:
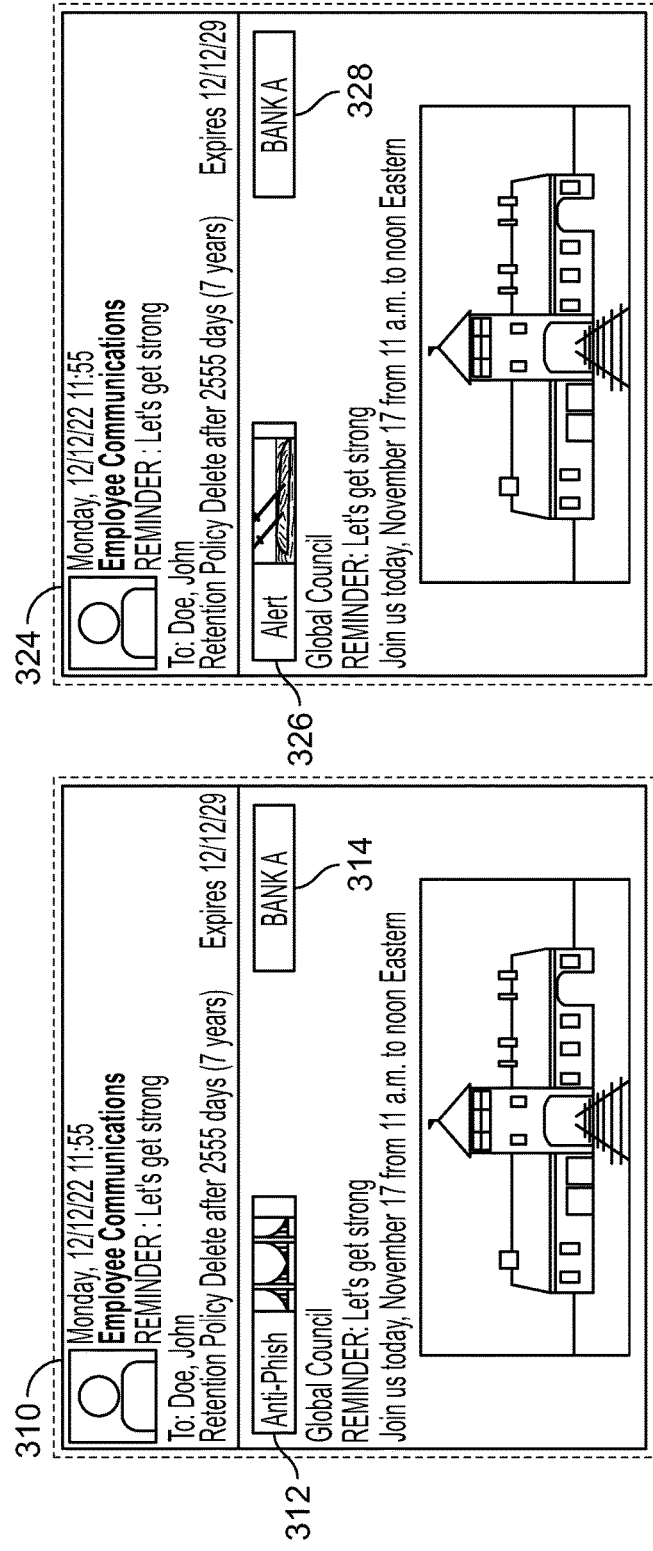

FIG. 3 shows an illustrative diagram. The illustrative diagram shows two electronic communications, electronic communications 302 and 316. The illustrative diagram also shows each of the electronic communications as it is displayed to a recipient. Electronic communication 302 may be shown displayed to a recipient as electronic communication 310. Electronic communication 316 may be shown displayed to a recipient as electronic communication 324.

Electronic communication 302 may have passed validation. Electronic communication 316 may have failed validation.

Electronic communication 302 may include header 304, body 306 and a double anti-phish token. The first part of the double anti-phish token may display a validation symbol, as shown at 308. The validation symbol may be a bridge, as shown at 312. The validation symbol may provide a quick visual aid to the recipient that electronic communication 302 was indeed transmitted by Bank A. The Bank A marker may be shown within the electronic communication at 314.

Electronic communication 316 may include header 320, body 322 and a double anti-phish token. The first part of the double anti-phish toke may display an alert symbol, as shown at 318. The alert symbol may be a shipwreck, as shown at 326. The alert symbol may provide a quick visual aid to the recipient that electronic communication 316 may be a phishing email impersonating Bank A. The impersonated Bank A marker may be shown within the electronic communication at 328. It should be noted that the legitimate Bank A marker, shown at 314, and the illegitimate Bank A marker, shown at 328, may appear the same to a recipient.

Figure 4:
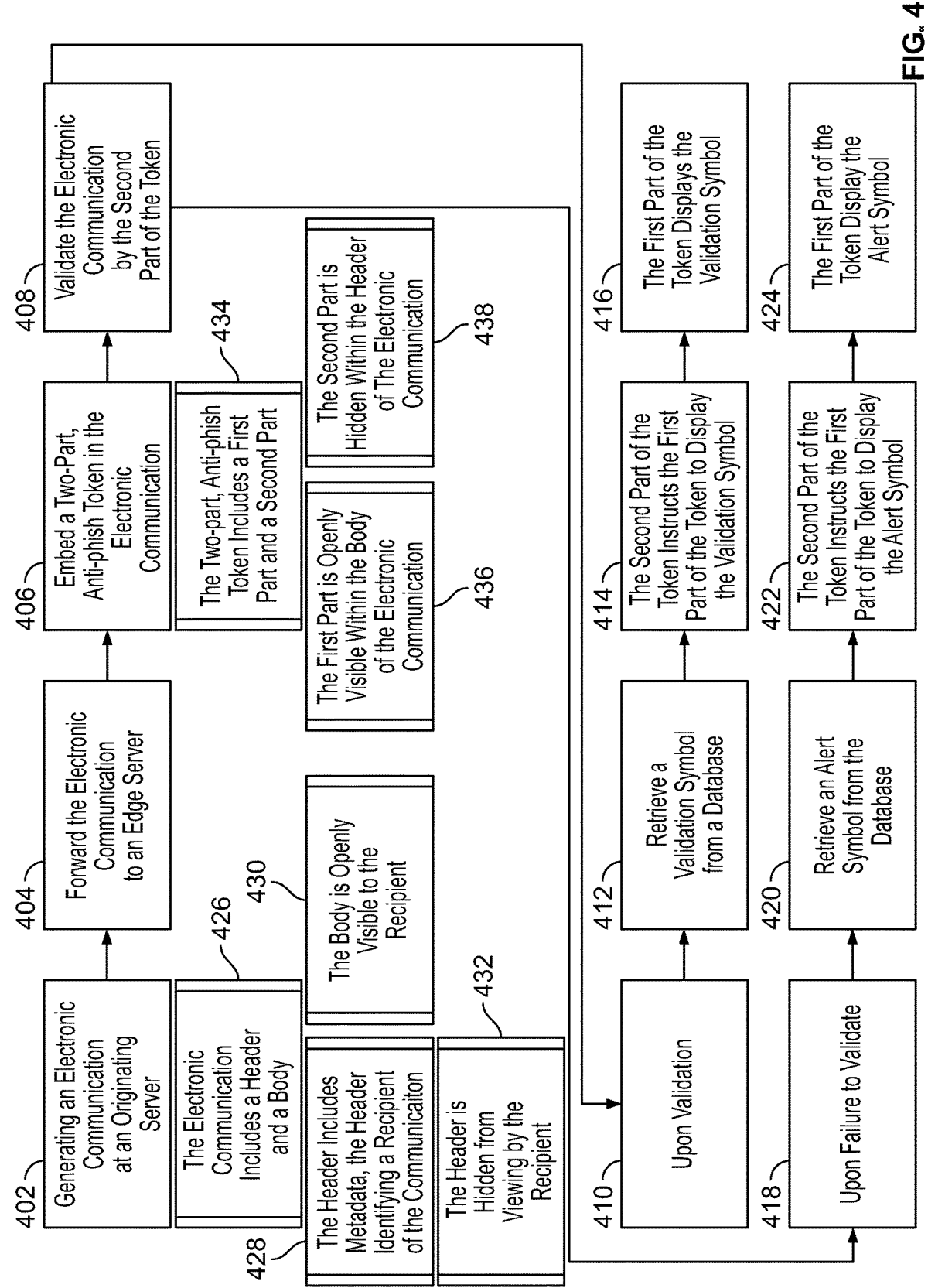
FIG. 4 shows still another illustrative diagram in accordance with principles of the disclosure.

FIG. 4 shows an illustrative flow chart. The illustrative flow chart shows the flow of an electronic communication between an originating server and a recipient.

Step 402 shows generating an electronic communication at an originating server. The electronic communication may include a header and a body, as shown at 426. The header may include metadata, as shown at 428. The header may identify the recipient of the communication, also shown at 428. The header, or at least a portion thereof, may be hidden from viewing by the recipient, as shown at 432. The body may be openly visible to recipient, as shown at 430.

Step 404 shows forwarding the electronic communication to an edge server.

Step 406 shows embedding a two-part, anti-phish token in the electronic communication. The two-part, anti-phish token may include a first part and a second part, as shown at 434. The first part may be openly visible within the body of the electronic communication, as shown at 436. The second part may be hidden within the header of the electronic communication, as shown at 438.

Step 408 shows validating the electronic communication by the second part of the token. Step 410 shows next steps when the electronic communication is validated. Step 418 shows next steps when the electronic communication fails to be validated.

Step 412 may be the next step in a process flow in which an electronic communication passed validation. Step 412 shows retrieval of a validation symbol from a database. Step 414 shows the second part of the token instructs the first part of the token to display the validation symbol. Step 416 shows the first part of the token displays the validation symbol.

Step 420 may be next step in a process flow in which an electronic communication failed validation. Step 420 shows retrieval of a n alert symbol from the database. Steps 422 shows the second part of the token instructs the first part of the token to display the alert symbol. Step 424 shows the first part of the token displays the alert symbol.

Thus, a double anti-phish, personalized, security token for use with electronic communications is provided. Persons skilled in the art will appreciate that the present invention can be practiced by other than the described embodiments, which are presented for purposes of illustration rather than of limitation. The present invention is limited only by the claims that follow.

What is claimed is:

1. A system for self-authenticating and self-alerting electronic communications, the system comprising:
an originating server, said originating server comprising:
a processor; and
a memory;
an edge server; and
a database;
wherein:
the originating server generates an electronic communication, the electronic communication comprising a header and a body, the header includes metadata of the electronic communication, the header identifies a recipient, the header is hidden from the recipient and the body is openly visible to the recipient;
the originating server forwards the electronic communication to the edge server;
the edge server embeds a two-part, anti-phish token in the electronic communication, the two-part, anti-phish token comprising a first part and a second part;
the first part of the two-part, anti-phish token is openly visible within the body of the electronic communication;
the second part of the two-part, anti-phish token is hidden within the header of the electronic communication;
the second part of the token validates the electronic communication;
and the first part of the token acts a shell to display validation performed by the second part of the token; and
upon validation, the second part of the token instructs the first part of the token to display a validation symbol within the first part of the token, the validation symbol is a dynamically-rotating, digital-artwork file linked to a non-fungible token ("NFT"), said digital-artwork file that rotates on a predetermined schedule, said validation symbol being retrieved from the database.

2. The system of claim 1 wherein the validation symbol is specific to the recipient.

3. The system of claim 1 wherein the validation symbol comprises a photograph, a numeric code, an animation, a plurality of photographs, a plurality of animations or a combination of the photograph, the numeric code, the animation, the plurality of photographs and/or the plurality of animations.

4. The system of claim 1 wherein during a registration process, the recipient selects and/or uploads the validation symbol to the database.

5. A system for self-authenticating and self-alerting electronic communications, the system comprising:
an originating server, said originating server comprising:
a processor; and
a memory;
an edge server; and
a database;
wherein:
the originating server generates an electronic communication, the electronic communication comprising a header and a body, the header includes metadata of the electronic communication, the header identifies a recipient, the header is hidden from the recipient and the body is openly visible to the recipient;
the originating server forwards the electronic communication to the edge server;
the edge server embeds a two-part, anti-phish token in the electronic communication, the two-part, antiphish token comprising a first part and a second part;
the first part of the two-part, anti-phish token is openly visible within the body of the electronic communication;
the first part of the token acts a shell to display a validation performed by the second part of the token;

the second part of the two-part, anti-phish token is hidden within the header of the electronic communication;

the second part of the token validates the electronic communication; and upon validation failure, the second part of the token instructs the first part of the token to display an alert symbol within the first part of the token, the alert symbol is a dynamically-rotating, digital-artwork file linked to a non-fungible token ("NFT"), said digital-artwork file that rotates on a predetermined schedule, said alert symbol retrieved from the database.

6. The system of claim 5 wherein the alert symbol is specific to the recipient.

7. The system of claim 5 wherein the alert symbol [is] comprises a photograph, a numeric code, an animation, a plurality of photographs, a plurality of animations or a combination of the photograph, the numeric code, the animation, the plurality of photographs and/or the plurality of animations.

8. The system of claim 5 wherein during a registration process, the recipient selects and/or uploads the alert symbol to the database.

9. A method for self-authenticating and self-alerting electronic communications, the method comprising:

generating an electronic communication at an originating server, the electronic communication comprising a header and a body, the header including metadata of the electronic communication, the header identifying a recipient of the electronic communication, the header hidden from viewing by the recipient and the body is openly visible to the recipient;

forwarding the electronic communication from the originating server to an edge server;

embedding a two-part, anti-phish token in the electronic communication, the two-part, anti-phish token including a first part and a second part, the first part openly visible within the body of the electronic communication, the second part hidden within the header of the electronic communication;

validating the electronic communication by the second part of the token;

upon validating, retrieving a validation symbol from a database, the validation symbol is a dynamically-rotating, digital-artwork file linked to a non-fungible token ("NFT"), said digital-artwork file that rotates on a predetermined schedule; and instructing, by the second part of the token, the first part of the token, to display the validation symbol.

10. The method system of claim 9 wherein the validation symbol is specific to the recipient.

11. The method of claim 9 wherein the validation symbol comprises a photograph, a numeric code, an animation, a plurality of photographs, a plurality of animations or a combination of the photograph, the numeric code, the animation, the plurality of photographs and/or the plurality of animations.

12. The method of claim 9 wherein during a registration process, the recipient selects and/or uploads the validation symbol to the database.

13. A method for self-authenticating and self-alerting electronic communications, the method comprising:

generating an electronic communication at an originating server, the electronic communication comprising a header and a body, the header including metadata of the electronic communication, the header identifying a recipient of the electronic communication, the header hidden from viewing by the recipient and the body is openly visible to the recipient;

forwarding the electronic communication from the originating server to an edge server;

embedding a two-part, anti-phish token in the electronic communication, the two-part, anti-phish token including a first part and a second part, the first part openly visible within the body of the electronic communication, the second part hidden within the header of the electronic communication;

failing to validate the electronic communication by the second part of the token;

upon failing to validate, retrieving an alert symbol from a database, the alert symbol is a dynamically-rotating, digital-artwork file linked to a non-fungible token ("NFT"), said digital-artwork file that rotates on a predetermined schedule; and instructing, by the second part of the token, the first part of the token, to display the alert symbol.

14. The method of claim 13 wherein the alert symbol is specific to the recipient.

15. The method of claim 13 wherein the alert symbol comprises a photograph, a numeric code, an animation, a plurality of photographs, a plurality of animations or a combination of the photograph, the numeric code, the animation, the plurality of photographs and/or the plurality of animations.

16. The method of claim 13 wherein during a registration process, the recipient selects and/or uploads the alert symbol to the database.

* * * * *